United States Patent [19]

Low et al.

[11] 3,862,111

[45] Jan. 21, 1975

[54] PEPTIDES OF ACTH ACTIVITY CONTAINING ALPHA-AMINOOXY CARBOXYLIC ACIDS ON BOTH TERMINALS AND A PROCESS FOR THE PREPARATION THEREOF

[75] Inventors: Miklos Low; Lajos Kisfaludy; Agnes Patthy; Maria Szirmai; Olga Nyeki; Laszlo Szporny; Gyorgy Hajos, all of Budapest, Hungary

[73] Assignee: Richter Gedeon Vegyeszti Gyar RT., Budapest, Hungary

[22] Filed: Aug. 15, 1973

[21] Appl. No.: 388,547

[30] Foreign Application Priority Data

Aug. 25, 1972 Hungary................................ RI-481

[52] U.S. Cl................................ 260/112.5, 424/179
[51] Int. Cl...................... C07c 103/52, A61k 17/06
[58] Field of Search.................... 260/112.5; 424/179

[56] References Cited
OTHER PUBLICATIONS
Kisfaludy et al.: Chem. Abstr. 75, 98305z (1971).
Kisfaludy et al.: Chem. Abstr. 75, 110073g (1971).
Kisfaludy et al.: Chem. Abstr. 72, 55894m (1970).

Primary Examiner—Lewis Gotts
Assistant Examiner—Reginald J. Suyat
Attorney, Agent, or Firm—Karl F. Ross; Herbert Dubno

[57] ABSTRACT

Novel peptides of ACTH activities having a complete ACTH sequence from the N-terminal amino acid at least to the 17th but at most to the 19th amino acid, but containing optionally other amino acids in the place of the individual amino acids of the ACTH sequence, and always containing an α-aminooxy acid in the place of the first and the last amino acids have been prepared by deblocking the appropriate protected peptide derivatives.

The new compounds, as well as their acid addition salts, derivatives or complexes possess potent ACTH activities and can be used in the therapy with great advantages.

6 Claims, No Drawings

PEPTIDES OF ACTH ACTIVITY CONTAINING ALPHA-AMINOOXY CARBOXYLIC ACIDS ON BOTH TERMINALS AND A PROCESS FOR THE PREPARATION THEREOF

This application is related to concurrently filed application Ser. No. 388,546.

This invention relates to novel peptides of ACTH activity containing α-aminooxy carboxylic acids on both terminals and to a process for the preparation of such compounds.

As is known, the peptide chain of adrenocorticotropic hormone (ACTH) can be modified to a considerable extent without the cessation of the adrenocorticotropic activity. Thus, e.g. more than one-third of the amino acid chain can be removed from the C-terminal part of the molecule without any decrease of the specific activity. Splitting of the further amino acids, however, leads to an abrupt fall of the activity. The peptide with the amino acid sequence 1–9 of ACTH possesses 30 % of the activity of the original molecule, while the activity of the 1–16 ACTH fragment is only about 1% of that of the starting substance. On the other hand, the removal of the first amino acid from the N-terminal part of the molecule leads to an 50 % decrease of the activity (E. Schroder, K. Lubke: The Peptides, Academic Press, New York, 1966, pp. 246 to 249).

The ACTH fragments, in which the N-terminal serine group is replaced by a D-amino acid, a non-natural amino acid or an acyl group obtained by omitting the functional groups of serine (e.g. β-hydroxypropionyl or propionyl group, sometimes possess activities exceeding that of the natural ACTH. This can be presumably attributed to the fact that these ACTH fragments of modified structures are resistant to the action of aminopeptidase-type enzymes, thus their decomposition rate in the organism is lower than that of the natural ACTH. Accordingly, these modified ACTH fragments show potent adrenocorticotropic activities also in those instances when the modifying group cannot entirely display the role of the N-terminal serine moiety of the natural hormone.

The fact that the effect of the C-terminal amide derivatives decreases later than that of the peptides containing free carboxy groups when decreasing the number of the amino acids starting from the C-terminal end of the chain can be traced to the same reasons. Namely, most of the carboxypeptidase enzymes cannot decompose the peptide-amides. Therefore it was assumed that by amidating the C-terminal carboxy group the same protecting effect can be ensured as by the appropriate replacement of the N-terminal serine moiety. In more recent investigations it has been found out, however, that some carboxypeptidase-type enzymes are able to split off even the C-terminal amino acid moieties of the peptide amides (J. D. Glass et al.: Proc. Nat. Acad. Sci. U.S. 63, 1426 /c1969). Due to the fact that even these enzymes cannot hydrolyze the substituted amides, one might expect that the ACTH fragments containing a substituted amide group on the C-terminal end of the chain would decompose in the organism with a lower rate and thus would show a greater biological effect than the appropriate simple amides. Indeed, German research workers succeeded in preparing some heptadecapeptide-alkylamide derivatives possessing strong adrenocorticotropic effects (published German Patent Application No. 1.954.794).

We have found that compounds of increased adrenocorticotropic activities can be obtained when replacing both of the terminal amino acids of the 1–17, 1–18 or 1–19 fragments of the ACTH molecule by an α-aminooxy acid. Compounds of particularly great activities are obtained when replacing the N-terminal serine moiety of the 1–18 fragment of ACTH by D-α-aminooxy-β-hydroxy-propionic acid and replacing the C-terminal arginine moiety of the same compound by L- or D-α-aminooxy-ε-amino-caproic acid.

Accordingly, this invention relates to novel peptides of ACTH activities, having a complete ACTH sequence from the N-terminal amino acid at least to the 17th but at most to the 19th amino acid, but containing optionally other amino acids in the place of the individual amino acids of the ACTH sequence, and always containing an α-aminooxy acid in the place of the first and the last amino acids. The invention relates further to the acid addition salts, derivatives and complexes of said peptides, as well as to a process for the preparation of such compounds.

In the substituted peptides mentioned above, the individual amino acids of the natural sequence may be replaced by other amino acids, provided that such a replacement does not cause a significant decrease in the ACTH activity. Thus, for example, the second amino acid (tyrosine) may be replaced by phenylalanine, and/or the third amino acid (serine) may be replaced by glycine, and/or the fourth amino acid (methionine) may be replaced by leucine, norvaline, norlecine or α-aminobutyric acid, and/or the fifth amino acid (glutaminic acid) may be replaced by glutamine, and/or the 15th and 16th amino acids (lysine) may be replaced by ornithine, and/or the 17th and 18th amino acids (arginines) may be replaced by lysine or ornithine. The most advantageous compounds with respect to their adrenocorticotropic activities are (D–OSer$^1$, OLys$^{18}$)-$\alpha^{1-18NH_2}$–ACTH and (D–OSer$^1$, D–OLys$^{18}$)-$\alpha^{1-18NH_2}$–ACTH, wherein "OSer" represents the α-aminooxy-β-hydroxypropionic acid differing from serine only in the single oxygen atom between the α-carbon atom and the amino group. In the specification such abbreviations are used for the designation of the α-aminooxy acids having amino acid-like structures, thus, for example, OLys represents α-aminooxy-ε-amino-caproic acid, etc.

The new peptides of ACTH activities, as well as their acid addition salts, derivatives and complexes can be prepared according to the invention stating from a protected peptide having a complete ACTH sequence from the N-terminal amino acid at least to the 17th but at most to the 19th amino acid, but containing optionally other α-aminoacids in the place of the individual amino acids of ACTH sequence, always containing an α-aminooxy acid in the place of the first and the last amino acids and carrying protecting groups at least on the terminal aminooxy group and on the amino groups of the side chains and optionally also on the terminal carboxy groups and on the carboxy groups of the side chains, deprotecting said peptide in one or more steps, and, if desired, converting the obtained compound into its acid addition salts, derivatives or complexes.

The protected peptides used as starting substances according to the invention can be prepared from the appropriate α-aminooxy acids and amino acids by fragment condensation or by the gradual introduction of the individual amino acids in the proper sequence. In these condensation processes the mixed anhydride method, the azide method, the active ester method or the DCC method can be used. The so-called solid phase synthesis can also be applied, according to which a peptide attached to a polymer on its terminal carboxy group is built up by coupling the C-terminal α-aminooxy acid bound to the polymer with the amino acids and with the terminal α-aminooxy acid in the proper sequence.

The reactive groups which are not allowed to participate in the reaction are protected preferably by protecting groups which can be easily removed again e.g. by hydrolysis, acidolysis, hydrazinolysis or reduction. The carboxy group is preferably protected in the form of its methyl, tert.butyl, benzyl, p-chlorobenzyl or p-nitrobenzyl ester or by converting it into an amide. The aminooxy and amino groups are protected preferably with tosyl, trityl, formyl, trifluoroacetyl, o-nitrosulfenyl, phthalyl, benzyloxycarbonyl, p-chlorobenzyl-oxycarbonyl, and most preferably, tert-.butoxycarbonyl groups. The guanidino group of the arginine moiety can be protected preferably with a nitro group, but this group can also be protected in protonated form. The imino group of histidine can be protected with benzyl, trityl or dinitrophenyl groups. The hydroxy groups attached to the side chains can be protected optionally by ether formation, in this instance the tert.butyl and benzyl ethers are the most preferred ones.

By the proper selection of the protecting groups one may prepare compounds which can be deprotected selectively or in a single step by methods known in the art (e.g. by hydrolysis, acidolysis, hydrazinolysis or reduction).

According to a preferred method of the invention a protected α-aminooxy acid is condensed with a tripeptide methyl ester of the formula Tyr-Ser-Met-OCH$_3$, the obtained substituted tetrapeptide methyl ester is converted into its hydrazide and finally into the azide, and this azide is used for the acylation of a decapeptide of the formula Glu(OBu$^t$)-His-Phe-Arg-Trp-Gly-Lys(-BOC)-Pro-Val-Gly. The thus-obtained substituted tetradecapeptide is condensed with a peptide ester built up from the appropriately protected complete further amino acid sequence, the obtained substituted peptide ester is converted into its hydrazide and finally into the azide, and this azide is used for the acylation of the appropriately protected C-terminal aminooxy acid derivative. Thus, for example, the substituted tetradecapeptide is condensed with the 15–16 dipeptide ester, 15–17 tripeptide ester or 15–18 tetrapeptide ester, respectively, to yield the appropriately substituted heptadecapeptide, octadecapeptide or nonadecapeptide, respectively. In this condensation reaction the DCC or active ester coupling methods can be utilized with great advantages. In this latter method, particularly when a pentachlorophenyl or pentafluorophenyl ester is used, the active ester need not be prepared separately, but it can be formed directly in the reaction mixture from the substituted tetradecapeptide with pentachlorophenol or pentafluorophenol and DCC (see e.g. British Patent No. 1.201.053).

One may also proceed as follows: the appropriately protected C-terminal aminooxy acid derivative is acylated with an appropriately protected 15–16 dipeptide, 15–17 tripeptide or 15–18 tetrapeptide, the N-terminal protecting group of the thus-obtained substituted peptide is selectively removed, and the obtained substance is condensed with the substituted tetradecapeptide to yield the appropriate protected peptide containing aminooxy acids on both terminals. At the end of this synthesis the tert. butoxycarbonyl groups attached to the N-terminal α-aminooxy group and to the amino groups of the side chains, the tert. butyl ester groups attached to the carboxy groups of the side chains, and, when not amidated, also to the C-termial carboxy group, as well as the tert.butyl ether groups optionally attached to the hydroxy groups of the side chains are split off simultaneously by acidolysis, such as by trifluoroacetic acid treatment. When the starting protected peptide contains also groups which cannot be removed using trifluoroacetic acid, e.g. formyl group, these groups are removed prior to or after the splitting of the other protecting groups, in a separate step. The deprotected end-product can be purified by countercurrent distribution or by column chromatography, such as by ion exchange chromatography using different types of carboxymethyl celluloses.

Depending on the preparation methods and reaction conditions, the new compounds are obtained in the form of the free bases or as their salts. The salts can be converted into the free bases by methods well known in the art. On the other hand, the free bases can be converted into their pharmaceutically acceptable acid addition salts by contacting them with organic or mineral acids, e.g. hydrochloric, sulfuric, phosphoric, formic, acetic, lactic, tartaric, citric acids, higher fatty acids, etc.

The derivatives of the new compounds, falling also within the scope of the invention, are e.g. the esters, amides, N-substituted amides, first of all the peptide amides amidated at the C-terminal carboxy group and containing optionally free carboxy groups in the side chain.

The pharmaceutically usable complexes of the new peptides according to the invention are compounds formed by contacting the new peptides with certain organic or mineral substances ensuring prolonged activity to the peptides. Such organic compounds may be e.g. some types of gelatine, various carboxymethylcelluloses, alginates, polyphlorethynphosphate, polymeric amino acids or other polymers or copolymers. Among the mineral compounds some metal derivatives, preferably the hydroxide and the hardly soluble salts (e.g. phosphates or pyrophosphates) of zinc can be used. In order to ensure prolonged activity certain silicates can also be used, which form with the peptides insoluble complexes of hitherto unknown structures.

The new peptides and their salts, derivatives or complexes can be used in the therapy in the form of pharmaceutical products. Such pharmaceutical products may contain the active agents in combination with organic or mineral carriers suitable for enteral or parenteral administration. The pharmaceutical products may be e.g. solid lyophilizates, wherein compounds inert to the peptides, such as mannitol, lactose or starch can be used as carriers. The suspensions or emulsions may also contain besides the active ingredient and the carrier inert preserving or stabilizing agents. The most advantageous pharmaceutical products contain the new peptides in the form of their complexes mentioned above, which ensure a prolonged activity to the product.

The pharmaceutical products may contain the active agents in amounts commonly used for adrenocorticotropic hormones, e.g. in a concentration of 0.1 to 5 mg./ml. These products can be administered 1 to 7 times a day by subcutaneous, intramuscular or parenteral route.

The process of the invention is elucidated in detail by the aid of the following non-limiting Examples.

The abbreviations used in the Examples for the designation of the amino acid and peptide derivatives are those offered by IUPAC–IUB (J.Biol. Chem. 247, 977 /1972/). The α-aminooxy acids are also marked by the OSer, OLys symbols, as discussed above. If no other is indicated, these abbreviations relate to the L configuration, with the exception of Gly. The following other abbreviations are used in the Examples: PCPOH = pentachlorophenol, PFPOH = pentafluorophenol, DCC = dicyclohexyl carbodiimide, DCU = dicyclohexyl urea, BOC = tert.butoxycarbonyl, Bu$^t$ = tert.butyl, For = formyl, ONSu = N-succinimidyloxy.

The melting points were determined in a Dr.Tottoly-type apparatus (Bechli, Switzerland). The thin-layer chromatographic examinations were carried out on a "Silicagel nach Stahl" adsorbent, using the following solvent mixtures:

1/ ethyl acetate: (pyridine:acetic acid:water = 20:6:11) = 99:1
2/ ethyl acetate: (pyridine:acetic acid:water 20:6:11) = 8:2
3/ ethyl acetate: (pyridine:acetic acid:water = 20:6:11) = 6:4

EXAMPLE 1

D-OSer-Tyr-Ser-Met-Glu-His-Phe-Arg-Trp-Gly-LysPro-Val-Gly-Lys-Lys-Lys-OLys-NH$_2$ 0.75 g. (0.267 moles) of BOC-D-OSer-Tyr-Ser-Met-Glu-(OBu$^t$)-His-Phe-Arg-Trp-Gly-Lys(BOC)-Lys(BOC)-Lys(BOC)-Olys(For)-NH$_2$ are dissolved in a mixture of 6 ml. of trifluoroacetic acid, 0.75 ml. of water and 0.75 ml. of anizol, the solution is left to stand for one hour, thereafter it is diluted with 150 ml. of ether. The separated precipitate is filtered off, washed with ether, and dried in vacuo over phosphorous pentoxide and potassium hydroxide. The thus-obtained 0.70 g. (86%) of substituted formyl-octapeptide-trifluoroacetate are dissolved in 10 ml. of water, and 0.25 ml. of mercapto ethanol are added to the solution. The pH of the mixture is adjusted to 5 with a sodium hydroxide solution, thereafter 11.5 ml. of a 2 molar hydrazinoacetate solution are introduced. The mixture is kept in a 95°C water bath for two hours, thereafter concentrated in vacuo and poured onto a column of Whatman CM-52 ion-exchanger. The substance is eluted with a linear buffer gradient solution prepared from 0.2 molar (pH = 6.7) and 0.5 molar(pH = 6.7) ammonium acetate buffers. The appropriate fractions are freeze-dried to yield 0.275 g. (38%) of the appropriate substituted octadecapeptide amide.

The protected substituted octadecapeptide amide used as starting substance is prepared as follows:

Step 1: L-α-tert.butoxycarbonyl-aminooxy-ε-formylamino-caproic acid (BOC-OLys(For).

23.2 g. (60 moles) of N-ε-formyl-D-lysine and 43.2 g. (423 mmoles) of sodium bromide are dissolved in 248 ml. of 2.5 n sulfuric acid. The solution is cooled to 0°C, and 13.3 g. (192 mmoles) of sodium nitrite are added to the stirred solution in small portions within 30 minutes. The reaction mixture is stirred for one hour at 0°C and for a further hour at room temperature, thereafter it is extracted with 3 × 200 ml. portions of ether. The combined etheral solutions are dried and evaporated. The residual 18.4 g. of crude D-α-bromo-ε-formyl amino-caproic acid are dissolved in 190 ml. of ethanol, and 8.4 g. (150 mmoles) of potassium hydroxide and 10.0 g. (76 mmoles) of tert. butoxycarbonyl-hydroxylamine are added to the solution. The reaction mixture is refluxed for 2 hours, thereafter left to stand at room temperature. Next day the solvent is distilled off, the residue is dissolved in 80 ml. of water, and the pH of this solution is adjusted to 3 with 10% hydrochloric acid. The acidic solution is saturated with sodium chloride and extracted with 3 × 150 ml. of ether and finally with 150 ml. of ethyl acetate. The organic solutions are combined, dried and evaporated, and the crystalline residue, weighing 16 g., is recrystallized from 25 ml. of ethyl acetate. 10.4 g. (27%) of L-α-tert.butoxycarbonyl-aminooxy-ε-formylamino-caproic acid are obtained; m.p.: 114°–116°C, R$_f$/2/ = 0.31,(α)$_D$ = –52.5° (c = 1, in methanol).

Analysis:
Calculated for C$_{12}$H$_{22}$N$_2$O$_6$ (290.32)
C: 49.6% H: 7.65%
Found: C: 49.9% H: 7.6%

Step 2: L-α-tert.butoxycarbonyl-aminooxy-ε-formyl-amino-caproic amide (BOC-OLys(For)-NH$_2$)

5.0 g. (17.2 mmoles) of BOC-OLys/For/ are dissolved in 107 ml. of dry tetrahydrofuran, and 1.90 ml. (17.2 mmoles) of N-methylmorpholine are added to the solution. The mixture is cooled to –10°C, and 2.25 ml. (17.2 mmoles) of isobutyl-chloroformate are added dropwise with stirring. The mixture is kept at the same temperature for 10 minutes, thereafter it is cooled to –20°C, and 10.7 ml. (142 mmoles) of concentrated ammonium hydroxide are dropped cautiously into the mixture. The obtained mixture is stirred for 1 hour at 0°C and for a further hour at room temperature. Thereafter tetrahydrofuran is evaporated, and the partially crystalline residue is diluted with 20 ml. of a 900:54:16:30 mixture of ethyl acetate - pyridine - acetic acid - water. The mixture is poured onto a 250 ml. silica gel column, and the column is eluted with the same solvent mixture. The fractions containing the aimed product are collected and evaporated to yield 4.3 g. ( 86%) of light yellowish, amorphous BOC-OLys(For)-NH$_2$. R$_f$/2/ = 0.54.

Step 3: tert.butoxycarbonyl-D-α-aminooxy-β-benzyloxypropionic acid

A mixture of 48.4 g. (0.364 moles) of tert.butoxycarbonyl-hydroxylamine, 40.7 g. (0.728 moles) of potassium hydroxide and 94.0 g. (0.364 moles) of DL-α-bromo-β-benzyloxypropionic acid in 360 ml. of water is stirred at room temperature for 3 hours. Thereafter the solution is acidified to pH = 3, and extracted with 3×720 ml. of ether. The etheral solutions are combined, washed with 720 ml. of water, dried, and admixed with 78 ml. (0.40 moles) of dicyclohexyl carbodiimide. The obtained 43.61 g. of tert.butoxycarbonyl-DL-α-aminooxy-β-benzyloxypropionic acid dicyclohexylamine salt (m.p.: 144°–146°C) are suspended in 500 ml. of ether, and the suspension is shaken with 5 × 100 ml. of 0.2 n sulfuric acid. The etheral solution is dried and evaporated to dryness. The residue is dissolved in 700 ml. of ethanol, and 6.56 g. (48.5 mmoles) of (+)-amphetamine base are added to the solution. The solution is left to stand in refrigerator overnight, thereafter the separated crystals are filtered off. The obtained tert.butoxycarbonyl-D-α-aminooxy-β-benzyloxypropionic acid-(+)-amphetamine salt is recrystallized from ethanol to yield 13.27 g. of purified product; m.p.: 188°–191°C,$(\alpha)_D^{26} = +54°$ (c + 0.5, in methanol). After decomposition of the salt in the usual way 7.9 g. (14 %) of tert.butoxycarbonyl-D-α-aminooxy-β-benzyloxypropionic acid are obtained; m.p.: 96-98°C,$(\alpha)_D^{30} = +38°$ (c = 1, in ethanol).

Step 4: tert.butoxycarbonyl-D-α-aminooxy-β-hydroxypropionic acid (BOC-D-OSer)

5.5 g. (17.7 mmoles) of D-α-tert.butoxycarbonyl-aminooxy-β-benzyloxypropionic acid are dissolved in 110 ml. of methanol, and the mixture is hydrogenated in the presence of 2.75 g. of 10% palladium-on-carbon catalyst. After 3 hours of hydrogenation the catalyst is filtered off, and the solvent is evaporated. The oily residue is covered with petroleum ether and left to stand for several hours. The crystalline substance is filtered off and dried. 3.65 g. (96%) of D-α-tert.butoxycarbonyl-aminooxy-β-hydroxypropionic acid are obtained; m.p.: 94-95°C, $R_f/1/ = 0.27$.

Step 5: BOC-D-OSer-Tyr-Ser-Met-N$_2$H$_3$ 4.4 g (20 mmoles) of BOC-D-OSer and 9.0 g. (20 mmoles) of Tyr-Ser-Met-OCH$_3$ are dissolved in 30 ml. of dimethyl formamide. The solution is cooled to 0°C and 2.22 ml. (20 mmoles) of N-methyl-morpholine and 3.8 g. (18.4 mmoles) of DCC are added. The reaction is stirred for one hour at 0°C and left to stand at room temperature overnight. Thereafter the separated DCU is filtered off, and the filtrate is evaporated. The residue is dissolved in 400 ml. of ethyl acetate, the solution is washed with 2 × 200 ml. of n hydrochloric acid, and with 2 × 200 ml. of 8% aqueous sodium hydrocarbonate solution, dried and evaporated. 8.10 g. of the protected substituted tetrapeptide ester are obtained as a residue. This residue is dissolved in 85 ml. of methanol, 2.2 ml. (46 mmoles) of hydrazine hydrate are added, and the solution is left to stand at room temperature overnight. The solvent is distilled off, the residue is triturated with ethyl acetate, filtered, washed with ethyl acetate and ether, and dried in a desiccator over concentrated sulfuric acid. 7.21 g. (63 %) of the protected substituted tetrapeptide hydrazide are obtained; m.p.: 174°–175°C (after recrystallization from water), $R_f/1/$: 0.30

Analysis:
Calculated for C$_{25}$H$_{40}$N$_6$O$_{10}$S (616.69):
C: 48.7% H: 6.55% N: 13.6%
Found: C: 48.3% H: 6.6 % N: 13.8%

Step 6: BOC-D-OSer-Tyr-Ser-Met-Glu(OBu$^t$)-His-Phe-Arg-Trp-Gly-Lys(BOC)-Pro-Val-Gly.HCl 1.25 g. (2.13 mmoles) of BOC-D-OSer-Tyr-Ser-Met-N$_2$H$_3$ are dissolved in 15 ml. of dimethyl formamide, and the solution is cooled to −20°C. 2.08 ml. (8.32 mmoles) of 4n ethyl acetate hydrochloric acid and 0.32 ml. (2.70 mmoles) of tert. butylnitrite are added dropwise to the stirred and cooled solution. The reaction mixture is stirred for 5 minutes at −10°C, cooled to −20°C, and a solution of 2.78 g. of Glu(OBu$^t$)-His-Phe-Arg-Trp-Gly-Lys(BOC)-Pro-Val-Gly and 1.4 ml. (8.13 mmoles) of diisopropyl ethylamine in 23 ml. of dimethyl formamide is added. The reaction mixture is stirred for one hour at −5° to 0°C, and left to stand at 0°C overnight. The solution is evaporated and the residue is triturated with 8% aqueous sodium hydrocarbonate solution. The solids are filtered off, washed with water and dried. 3.49 g. (94%) of the protected substituted tetradecapeptide are obtained.

This product is suspended in 24 ml. of methanol, and the suspension is added to a mixture of 4.75 ml. of concentrated hydrochloric acid and 4.75 ml. of pyridine. The obtained solution is diluted with 240 ml. of water, the separated precipitate is filtered off washed with water, and dried. 2.95 g. (73%) of the protected substituted tetradecapeptide hydrochloride are obtained; m.p.: 200°–202°C, $R_f/2/ = 0.25$ Step 7: Lys(BOC)-Lys(BOC)-OCH$_3$ oxalate 11.0 g. (17.7 mmoles) of Z-Lys(BOC)-Lys(BOC)-OCH$_3$ (K, Hofman et al.: J. Am. Chem. Soc. 86, 4991 (1964) are dissolved in 200 ml. of methanol. 2.0 g. (22.2 mmoles) of anhydrous oxalic acid are added, and the mixture is hydrogenated in the presence of 2.0 g. of 10% palladium-on-carbon catalyst. When the reaction terminates the catalyst is removed by filtration, the filtrate is evaporated, and the residue is triturated with ether. 9.1 g. (89%) of the dipeptide ester oxalate are obtained; m.p.: 65°–67°C (after recrystallization from a mixture of isopropanol and diisopropyl ether). $R_f/2/ = 0.34$, $(\alpha)_D = +3.79°$ (c = 1,) (in methanol).

Analysis:
Calculated for C$_{25}$H$_{46}$N$_4$O$_{11}$ (578.65):
C: 51.9% H: 8.9% N: 9.7%
Found: C: 51.5% H: 7.9% N: 9.9%

Step 8: Z-Lys(BOC)-Lys(BOC)-Lys(BOC)-OCH$_3$ 8.1 g. (14.0 mmoles) of Lys(BOC)-Lys(BOC)-OCH$_3$ oxalate are suspended in 60 ml. of ethyl acetate. 3.1 ml. (28.0 mmoles) of N-methyl-morpholine and 6.7 g. (14.0 mmoles) of Z-Lys(BOC)-ONSu are added to the suspension, and the mixture is stirred for 2 hours at room temperature. The thick reaction mixture is diluted with 200 ml. of ethyl acetate and 40 ml. of water. The aqueous phase is separated, and the organic solution is washed successively with 2 × 40 ml. of n hydrochloric acid and 2 × 40 ml. of 8% aqueous sodium hydrocarbonate solution. The organic solution is dried over sodium sulfate, evaporated, and the residue is triturated with diisopropyl ether. The obtained crude product is recrystallized from a mixture of isopropanol and diisopropyl ether. 8.0 g. (67%) of the protected tripeptide methyl ester are obtained; m.p.: 117°–118°C, $R_f/1/ = = 0.58$; $(\alpha)_D = −17.47°$ (c = 1, in methanol).

Analysis:
Calculated for C$_{42}$H$_{70}$N$_6$O$_{12}$, (851.03):
C: 59.3% H: 8.3%
Found: C: 59.7% H: 8.2%

Step 9: BOC-D-OSer-Tyr-Ser-Met-Glu(OBu$^t$)-His-PheArg-Trp-Gly-Lys(BOC)-Pro-Val-Gly-Lys(BOC)-Lys(BOC)-Lys(BOC)-OCH$_3$.HCl 1.25 g. of Z-Lys(BOC)-Lys(BOC)-Lys(BOC)-OCH$_3$ are dissolved in 25 ml. of methanol, and the mixture is hydrogenated in the presence of 0.2 g. of 10% palladium-on-carbon. When the reaction terminates the catalyst is filtered off, the solvent is removed by evaporation, and the residual tripeptide ester and 2.42 g. (1.24 mmoles) of BOC-D-OSer-Tyr-Ser-Met-Glu(OBu$^t$)-His-Phe-Arg-Trp-Gly-Lys(BOC)-Pro-Val-Gly.HCl are dissolved in 12 ml. of dimethyl formamide. 0.97 g. (3.64 mmoles) of PCPOH and 0.255 g. (1.24 mmoles) of DCC are added to the solution, and the mixture is permitted to stand at room temperature for 2 days. Thereafter the separated DCU is filtered off, the filtrate is concentrated in vacuo, and the product is precipitated by adding ether to the concentrate. The product is filtered off and dried. 3.4 g. of crude product are obtained; m.p.: 177°C (under decomposition). This crude product is purified by precipitation from methanol with ether to yield 2.6 g. (80%) of the protected substituted heptadecapeptide methyl ester hydrochloride; m.p.: 191°C (under decomposition), $R_f/3/ = 0.54$.

Step 10: BOC-D-OSer-Tyr-Ser-Met-Glu(OBu$^t$)-His-Phe-Arg-Trp-Gly-Lys(BOC)-Pro-Val-Gly-Lys(BOC)-Lys-(BOC)-Lys(BOC)-N$_2$H$_3$ 2.5 g. (0.93 mmoles) of BOC-D-OSer-Tyr-Ser-Met-Glu(OBu$^t$)-His-Phe-Arg-Trp-Gly-Lys(BOC)-Pro-Val-Gly-Lys(BOC)-Lys(BOC)-Lys(BOC)-OCH$_3$.HCl are dissolved in 75 ml. of hot methanol. The solution is cooled to room temperature, 0.91 ml. (18.7 mmoles) of hydrazine hydrate are added to the solution, and the mixture is left to stand at room temperature for two days. Thereafter methanol is distilled off, and the residue is triturated with ether. 2.15 g. of crude product are obtained, m.p.: 199°C (under decomposition). The crude product is purified by precipitation from dimethyl formamide with water. 2.00 g. (81%) of the protected substituted heptadecapeptide hydrazide are obtained; m.p.: 205°C (under decomposition), $R_f/3/ = 0.49$.

Step 11: BOC-D-OSer-Tyr-Ser-Met-Glu(OBu$^t$)-HisPhe-Arg-Trp-Gly-Lys(BOC)-Pro-Val-Gly-Lys(BOC)-Lys(BOC)-Lys(BOC)-OLys(For)-NH$_2$ a. 0.57 g. (1.97 mmoles) of BOC-OLys(For)-NH$_2$ are dissolved in 7.5 ml. of trifluoroacetic acid. After 0.5 hours of standing the solution is evaporated in vacuo, and the residue is dissolved in 4 ml. of dimethyl formamide. The solution is neutralized with diisopropyl ethylamine.

b. 1.00 g. (0.377 mmoles) of BOC-D-OSer-Tyr-Ser-Met-Glu(OBu$^t$)-His-Phe-Arg-Trp-Gly-Lys(BOC)-Pro-Val-Gly-Lys(BOC)-Lys(BOC)-Lys(BOC)-N$_2$H$_3$ are dissolved in 5 ml. of dimethyl formamide under gentle heating. The solution is cooled to −20°C, and 0.54 ml. (1.52 mmoles) of 2.8 N ethyl acetate hydrochloric acid and 0.05 ml. (0.42 mmoles) of tert. butylnitrite are added dropwise to the stirred solution. The reaction mixture is stirred at −10°C for 5 minutes, then cooled to −20°C, and the neutral solution of OLys(For)-NH$_2$-trifluoroacetate, obtained as described above, is added to the solution together with 0.2 ml. (1.17 mmoles) of diisopropyl ethylamine. The reaction mixture is stirred at −5° to 0°C for 1 hours, and left to stand at 0°C overnight. Thereafter 50% of the solvent is distilled off, and the concentrate is diluted with 20 ml. of water. The separated mass solidified upon standing. The obtained substance is powdered under water, filtered and dried. 0.80 g. (75.5%) of the protected substituted octadecapeptide amide are obtained; m.p.: 140°–145°C, $R_f/3/ = 0.47$.

EXAMPLE 2

D-OSer-Tyr-Ser-Met-Glu-His-Phe-Arg-Trp-Gly-Lys-Pro-Val-Gly-Lys-Lys-Lys-D-OLys-NH$_2$ 0.75 g. (0.267 mmoles) of BOC-D-OSer-Tyr-Ser-Met-Glu(OBu$^t$)-His-Phe-Arg-Trp-Gly-Lys(BOC)-Pro-Val-Gly-Lys(BOC)-Lys(BOC)-Lys(BOC)-D-OLys/For/-NH$_2$ are dissolved in the mixture of 6 ml. of trifluoro acetic acid, 0.75 ml. of water and 0.75 ml. of anisol, the solution is allowed to stand for 1 hour, thereafter it is diluted with 150 ml. of ether. The separated precipitate is filtered off, washed with ether, and dried in a vacuum desiccator over phosphorous pentoxide and potassium hydroxide. The thus-obtained 0.65 g. (80%) of substituted formyl-octadecapeptide trifluoroacetate are dissolved in 10 ml. of water, 0.25 ml. of mercapto ethanol are added, the solution is neturalized with N sodium hydroxide solution to pH =5, thereafter 10.6 ml. of 2M hydrazine acetate solution are added, and the mixture is kept in a water bath of 95°C for 2 hours. The mixture is concentrated in vacuo, and the concentrate is poured onto a column of Whatman CM–52 ion exchanger. The column is eluted with a buffer gradient prepared from 0.2 M (pH 6.7) and 0.5M (pH 6.7) ammonium acetate buffer, and the appropriate fractions are collected and freeze-dried. 0.28 g. (41%) of the substituted octadecapeptide amide are obtained.

The protected substituted octadecapeptide amide, used as starting substance, can be prepared as follows:

Step 1: D-α-tert.butoxycarbonyl-aminooxy-ε-formylamino-caproic acid (BOC-D-OLys(For))

This compound is prepared starting from N-ε-formyl-L-lysine as described in Example 1, Step 1. M.p.: 114°–116°C, $R_f/2/ = 0.31, (\alpha)_D c = +58.6°$ (c = 1, in methanol).

Analysis:
Calculated for C$_{12}$H$_{22}$N$_2$O$_6$ (290.32):
C: 49.6% H: 7.65%
Found: C: 50.0% H: 7.6 %

Step 2: D-α-tert.butoxycarbonyl-aminooxy-ε-formylamino-caproic amide (BOC-D-OLys(For)-NH$_2$)

This compound is prepared from 5.0 g. (17.2 mmoles) of BOC-D-OLys(For) as described in Example 1, Step 2. 4.4 g. (88%) of the aimed product are obtained $R_f/2/ = 0.54$.

Step 3: BOC-D-Oser-Tyr-Ser-Met-Glu(OBu$^t$)-His-Phe-Arg-Trp-Gly-Lys(BOC)-Pro-Val-Gly-Lys(BOC)-Lys(BOC)-Lys(BOC)-D-OLys/For/-NH$_2$ This compound is prepared starting from 0.57 g. (1.97 mmoles) of BOC-D-OLys(For)-NH$_2$ as described in Example 1, Step 11. 0.90 g. (85%) of the protected substituted octadecapeptide amide are obtained; m.p.: 140°–145°C, $R_f/3/ = 0.47$.

What we claim is:

1. A peptide containing 17 to 19 amino acid units of the N-terminal part of the natural adrenocorticotropic hormone wherein the first and last amino acids are replaced by -D-O-Ser-and -O-Lys-NH$_2$ respectively.

2. A peptide containing 17 to 19 amino acid units of the N-terminal part of the adrenocorticotropic hormone, wherein the first and last amino acids are replaced by -D-O-Ser- and -OLys-NH$_2$ respectively and wherein the second amino acid is tyrosine or phenylalanine, the third amino acid is serine or glycine, the fourth amino acid is methionine, leucine, norvaline, norleucine or amino butyric acid, the fifth amino acid is glutamic acid or glutamine, the fifteenth and sixteenth amino acids are lysine or ornithine, and the seventeenth and eighteenth amino acids are arginine, lysine, or ornithine.

3. A peptide containing 17 to 19 amino acid units having the amino acid sequence
D-OSer-Tyr-Ser-Met-Glu-His-Phe-Arg-Trp-Gly-Lys-Pro-Val-Gly-Lys-Lys-Y, wherein Y stands for W, Arg-W, Lys-W, Orn-W, Lys-Arg-W, or Arg-arg-W, and W is -OLys- NH$_2$.

4. A compound as defined in claim 3 wherein Y is Lys-W and wherein W is -OLys-NH$_2$ or -D-OLys-NH$_2$.

5. The peptide D-OSer-Tyr-Ser-Met-Glu-His-Phe-Arg-Trp-Gly-Lys-Pro-Val-Gly-Lys-Lys-Lys-OLys-NH$_2$.

6. The peptide D-OSer-Tyr-Ser-Met-Glu-His-Phe-Arg-Trp-Gly-Lys-Pro-Val-Gly-Lys-Lys-Lys-D-OLys-NH$_2$.

* * * * *

UNITED STATES PATENT OFFICE
CERTIFICATE OF CORRECTION

Patent No. 3,862,111      Dated January 21, 1975

Inventor(s) Miklos Low et al.

It is certified that error appears in the above-identified patent and that said Letters Patent are hereby corrected as shown below:

The term of this patent subsequent to March 25, 1992, has been disclaimed.

Signed and Sealed this twenty-second Day of June 1976

[SEAL]

Attest:

RUTH C. MASON
*Attesting Officer*

C. MARSHALL DANN
*Commissioner of Patents and Trademarks*